J. F. BURNS.
JUNCTION BOX FOR ELECTRICAL CONDUCTORS.
APPLICATION FILED SEPT. 30, 1908.
927,219.
Patented July 6, 1909.
3 SHEETS—SHEET 1.
FIG. I.
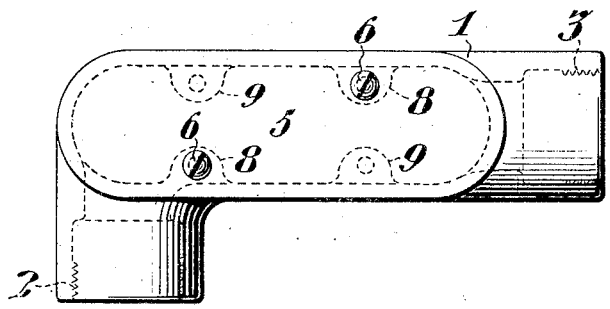
FIG. II.
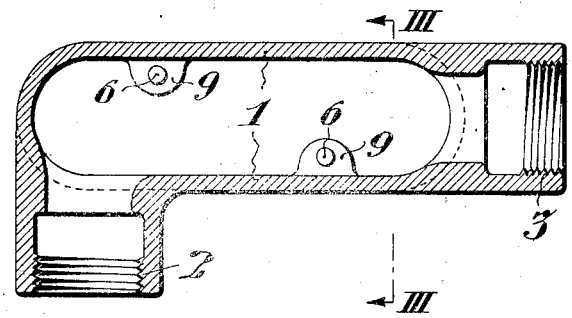
FIG. III.
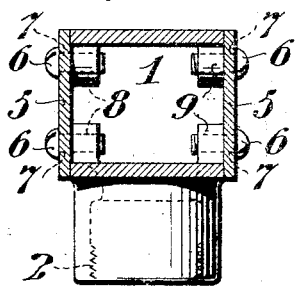
FIG. IV.
WITNESSES:
Clifton C. Hallowell
Philip W. Vessey
INVENTOR:
JAMES F. BURNS,
by Arthur E. Paige
Atty.

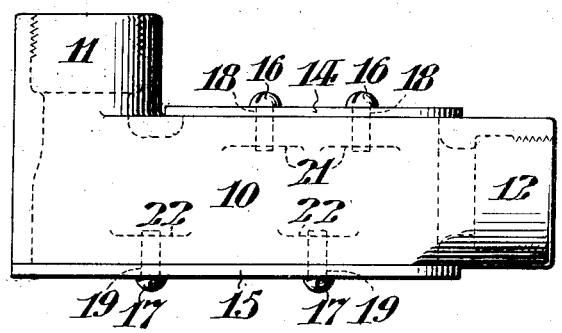
FIG. V.
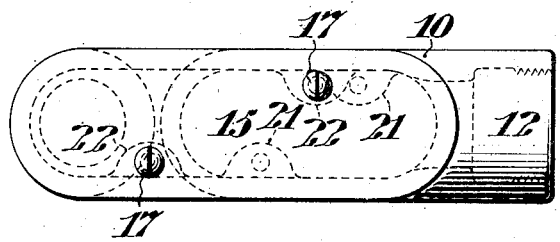
FIG. VI.
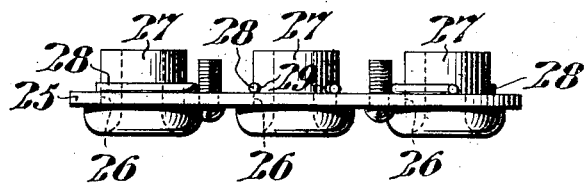
FIG. VII.

J. F. BURNS.
JUNCTION BOX FOR ELECTRICAL CONDUCTORS.
APPLICATION FILED SEPT. 30, 1908.
927,219.
Patented July 6, 1909.
3 SHEETS—SHEET 3.
FIG. VIII.
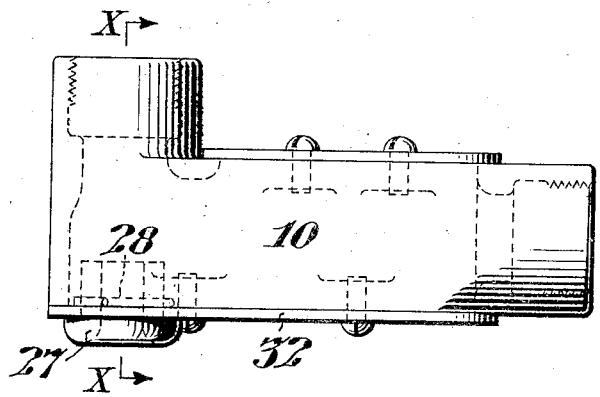
FIG. IX.
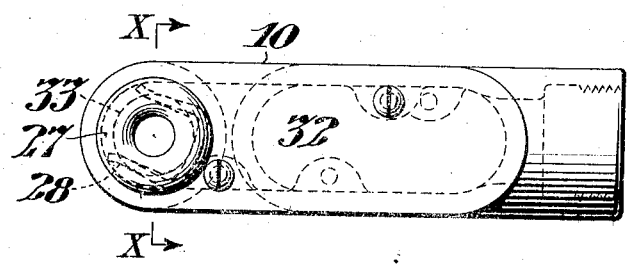
FIG. X.
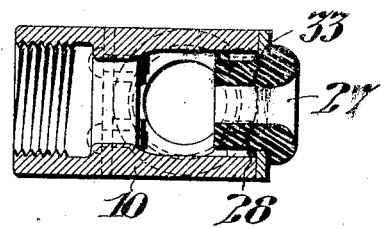
FIG. XI.
WITNESSES:
Clifton C. Hallowell
Philip W. Vessey
INVENTOR:
JAMES F. BURNS,

UNITED STATES PATENT OFFICE.

JAMES F. BURNS, OF PHILADELPHIA, PENNSYLVANIA.

JUNCTION-BOX FOR ELECTRICAL CONDUCTORS

No. 927,219.

Specification of Letters Patent.

Patented July 6, 1909.

Application filed September 30, 1908. Serial No. 455,476.

*To all whom it may concern:*

Be it known that I, JAMES F. BURNS, of Philadelphia, in the State of Pennsylvania, have invented a certain new and useful Improvement in Junction-Boxes for Electrical Conductors, whereof the following is a specification, reference being had to the accompanying drawings.

My improvement is particularly applicable to what are known as elbow fittings, and it is the object thereof to provide such a box, which may be connected in either right or left hand relation with the conduit, with the advantage that a single pattern of box constructed in accordance with my improvement may be substituted for two respectively right and left hand patterns of boxes heretofore required.

As hereinafter described, my invention comprises a box having sockets for conduits with axes in right angular relation, and openings between said sockets upon opposite sides of the box; removable covers for said openings and means arranged to detachably retain said covers in rigid relation; it being understood that one or the other of said covers is removed to afford access to the interior of the box in accordance with its position in right or left hand relation to the conduit.

My invention comprises the various novel features of construction and arrangement hereinafter more definitely specified.

In said drawings; Figure I, is a side elevation of a box conveniently embodying my improvement. Fig. II, is a central, longitudinal, sectional view of the box shown in Fig. I. Fig. III, is a transverse sectional view of said box taken on the line III, III in Fig. II. Fig. IV, is a plan edge view of one of the cover plates shown in section in Fig. III. Fig. V, is a side elevation of a box embodying a modified form of my invention. Fig. VI, is an inverted plan view of the box shown in Fig. V. Fig. VII, is an edge view of the cover plate shown in Fig. V, provided with insulating bushings. Fig. VIII, is a side elevation of a box similar to Fig. V, embodying a cover plate similar to the cover plate shown in Fig. VII, but provided with a single insulating bushing. Fig. IX, is an inverted plan view of the box shown in Fig. VIII. Fig. X, is a transverse vertical sectional view taken on the lines X, X in Figs. VIII and IX. Fig. XI is an edge view of a cover plate formed wholly of ceramic.

Referring to the form of my invention shown in Figs. I to IV, inclusive, 1 is the box having screw threaded sockets 2 and 3, to receive conduits with their axes in right angular relation. Said box has openings between said sockets upon opposite sides respectively provided with removable covers 5, which are detachably retained in rigid relation with the box by screws 6, extending through apertures 7, in said covers in screw threaded engagement with lugs 8 and 9. Referring to Fig. I, it may be observed that the lugs 8 and 9, which are respectively upon opposite sides of the box are disposed in staggered relation so that covers 5 of precisely the same form may be fitted upon the respectively opposite sides of the box.

Referring to the form of my invention shown in Figs. V to VII inclusive, the box 10, has screw threaded sockets 11 and 12, to receive conduits with their axes in right angular relation, and said box has openings between said sockets upon opposite sides respectively provided with removable covers 14, and 15, which are detachably retained in rigid relation with the box by screws 16 and 17, extending through apertures 18 and 19, in said covers in screw threaded engagement with respective lugs 21 and 22.

As shown in Figs. V and VI, the cover 15, is not provided with any outlets, but it is to be understood that the cover 25, shown in Fig. VII, may be substituted for said cover 15, and comprises outlets 26, respectively provided with insulating bushings 27, conveniently formed of ceramic, provided with means distinct from said cover, arranged to detachably retain said bushings and comprising the spring clips 28, arranged to detachably engage the recesses 29, in said bushings.

As shown in Figs. VIII, IX and X, the box 10, is provided with a cover plate 32, similar to the cover plate 25, but having a single outlet 33, provided with the bushing 27, which is retained by the spring clip 28.

It is to be understood that the covers 5, shown in Figs. I to IV inclusive, may also be provided with suitable outlets and insulating bushings such as are shown in Figs. VII, VIII, IX and X. Moreover, it is to be understood that a cover 35, formed wholly of ceramic and having one or more outlets 36, may be substituted for the outlet covers above described.

It may be observed that regardless of the position of the elbow fittings above described, access may be had to the interior thereof through one or the other of the removable covers with which they are provided, so that electrical conductors may be readily drawn through one and directed through the other of said conduits. Moreover drop connections may be made directly from such a box through an outlet or outlets in one or the other of the covers thereof, without the employment of a separate outlet box.

I do not desire to limit myself to the precise details of construction and arrangement herein set forth, as it is obvious that various modifications may be made therein without departing from the essential features of my invention as defined in the appended claims.

I claim:—

1. An elbow fitting having screw threaded sockets for conduits in right angular relation, and counterpart openings between said sockets upon opposite sides; interchangeable covers for said openings; means arranged to detachably retain said covers in rigid relation; a removable bushing, having a recess, in one of said covers; and, means distinct from said cover, arranged to detachably retain said bushing therein, comprising a spring clip arranged to engage the recess in said bushing.

2. An elbow fitting having screw threaded sockets for conduits whose axes intersect, and openings between said sockets upon opposite sides; removable covers for said openings; means arranged to detachably retain said covers in rigid relation; a removable bushing, having a recess, in one of said covers; and, means distinct from said cover, arranged to detachably retain said bushing therein, comprising a spring clip arranged to engage the recess in said bushing.

3. An elbow fitting having sockets for conduits in angular relation to each other, and openings between said sockets upon opposite sides; removable covers for said openings; means arranged to detachably retain said covers in rigid relation; a removable bushing in one of said covers; and, means distinct from said cover arranged to detachably retain said bushing therein.

4. An elbow fitting having sockets for conduits in angular relation to each other, and openings between said sockets upon opposite sides respectively parallel with the axis of one of said sockets; removable covers for said openings; and, means arranged to detachably retain said covers in rigid relation.

5. An elbow fitting having sockets for conduits in angular relation to each other, and openings between said sockets upon opposite sides; removable covers for said openings; and means arranged to detachably retain said covers in rigid relation.

6. An elbow fitting having sockets for conduits in angular relation to each other, and openings between said sockets upon opposite sides respectively parallel with the axis of one of said sockets; removable covers for said openings; lugs in each of said openings, the lugs in each opening being in staggered relation to the lugs in the other opening; and, means arranged to respectively detachably connect said covers in rigid relation with said lugs.

In testimony whereof I have hereunto signed my name at Philadelphia, Pennsylvania, this twenty-ninth day of September 1908.

JAMES F. BURNS.

Witnesses:
 JOHN H. BAKER,
 CLARENCE W. SHICK.